(12) United States Patent
Kurokawa

(10) Patent No.: US 7,679,728 B2
(45) Date of Patent: Mar. 16, 2010

(54) DISTANCE MEASURING SYSTEM

(75) Inventor: Takashi Kurokawa, Tokyo (JP)

(73) Assignee: National University Corporation Tokyo University of Agriculture and Technology, Fuchu, Tokyo (JP)

( * ) Notice: Subject to any disclaimer, the term of this patent is extended or adjusted under 35 U.S.C. 154(b) by 0 days.

(21) Appl. No.: 12/224,559

(22) PCT Filed: Mar. 2, 2007

(86) PCT No.: PCT/JP2007/054617

§ 371 (c)(1),
(2), (4) Date: Nov. 10, 2008

(87) PCT Pub. No.: WO2007/108330

PCT Pub. Date: Sep. 27, 2007

(65) Prior Publication Data

US 2009/0180099 A1    Jul. 16, 2009

(30) Foreign Application Priority Data

Mar. 2, 2006    (JP) .............................. 2006-055623

(51) Int. Cl.
*G01C 3/08* (2006.01)
*G01B 11/14* (2006.01)

(52) U.S. Cl. ...................... 356/4.01; 356/5.01; 356/614

(58) Field of Classification Search ................ 356/4.01, 356/5.01, 73.1, 614
See application file for complete search history.

(56) References Cited

U.S. PATENT DOCUMENTS

| | | | | |
|---|---|---|---|---|
| 5,592,577 | A * | 1/1997 | Tanoue | 385/12 |
| 5,991,479 | A * | 11/1999 | Kleinerman | 385/31 |
| 6,813,403 | B2 * | 11/2004 | Tennyson | 385/12 |
| 7,385,551 | B2 * | 6/2008 | Stephens | 342/146 |
| 2007/0019212 | A1 * | 1/2007 | Gatsios et al. | 356/614 |
| 2007/0253000 | A1 * | 11/2007 | Vallan et al. | 356/477 |
| 2009/0147261 | A1 * | 6/2009 | Hawkinson et al. | 356/438 |

* cited by examiner

*Primary Examiner*—Isam Alsomiri
(74) *Attorney, Agent, or Firm*—Manabu Kanesaka

(57) ABSTRACT

The distance detector 12b returns part of the light received from the distance detector 12a located at the starting point side by reflection, or reflection and refraction, sends the remaining part of the light to the distance detectors 12b, 12c, 12d and 12e located at the forefront end side by transmission, refraction, reflection or a combination thereof, and returns the returned light from the distance detectors 12b-12e to the distance detector 11a located at the starting point by transmission, refraction, reflection or a combination thereof. By using laser light sources, it is possible to measure the distance from the laser light sources to multiple points or the distance between two points with a high degree of accuracy.

11 Claims, 14 Drawing Sheets

Fig.2
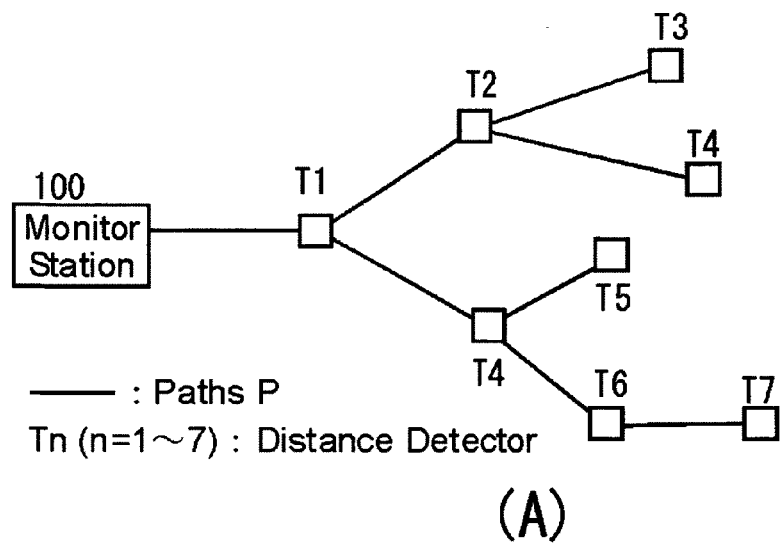
— : Paths P
Tn (n=1～7) : Distance Detector
(A)
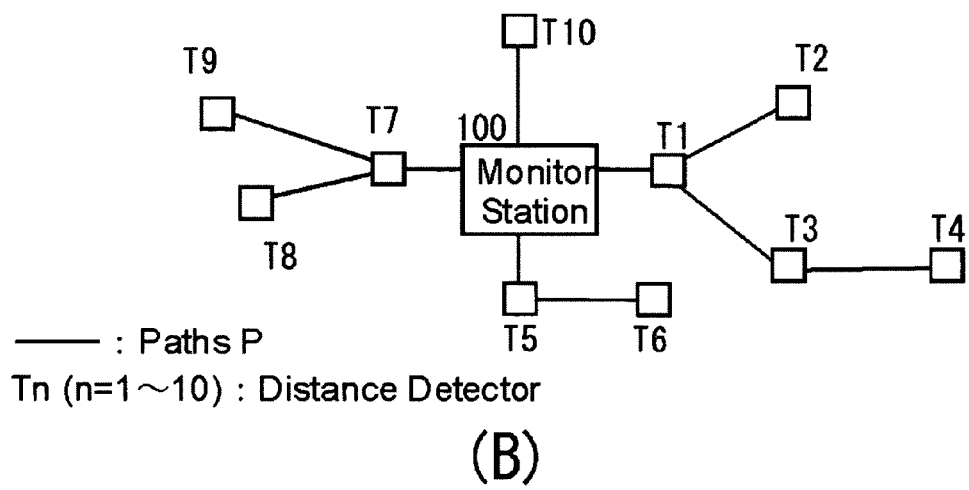
— : Paths P
Tn (n=1～10) : Distance Detector
(B)

Fig.9
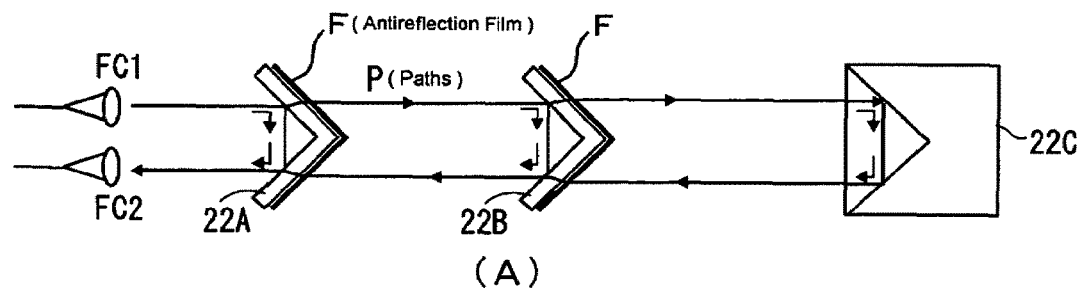
(A)
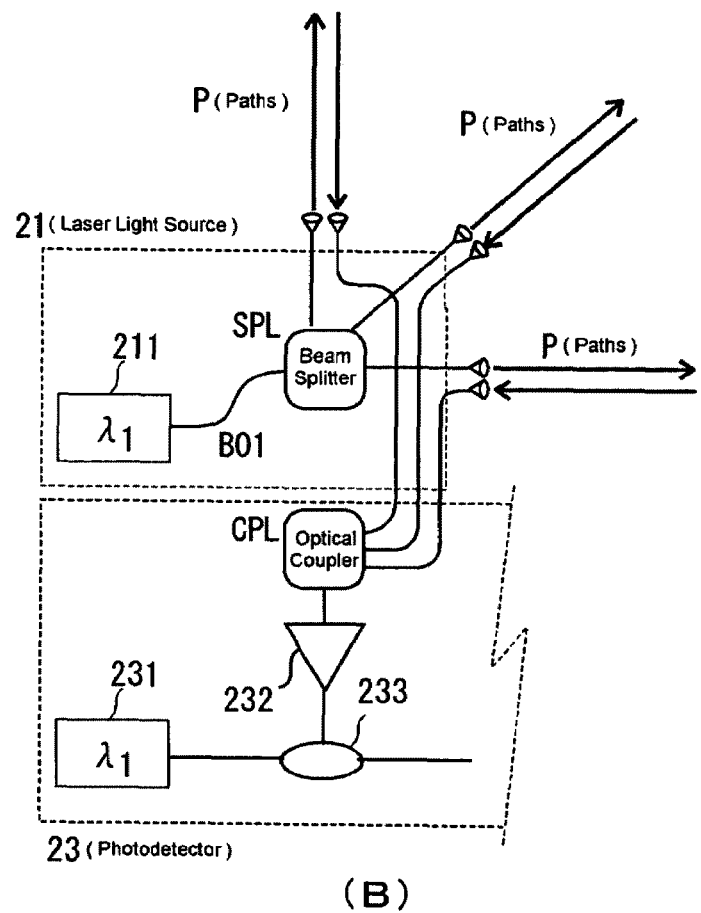
(B)

Fig.12
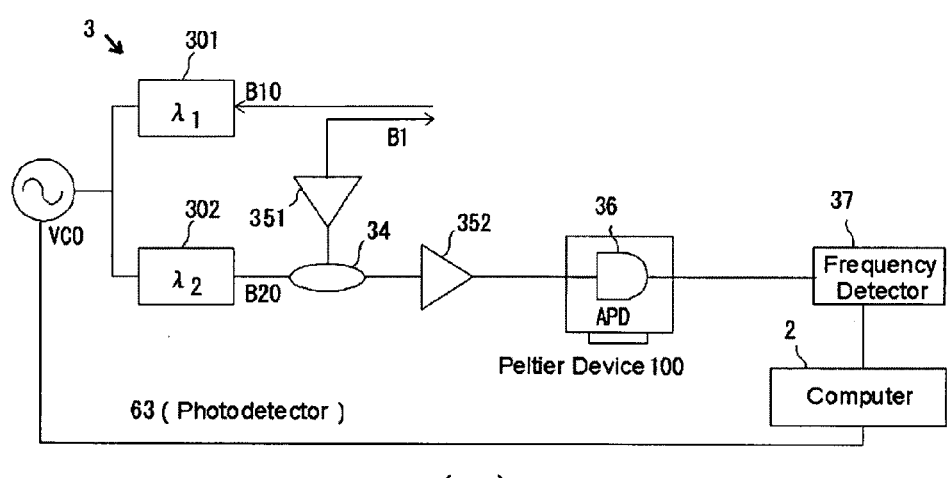
(A)
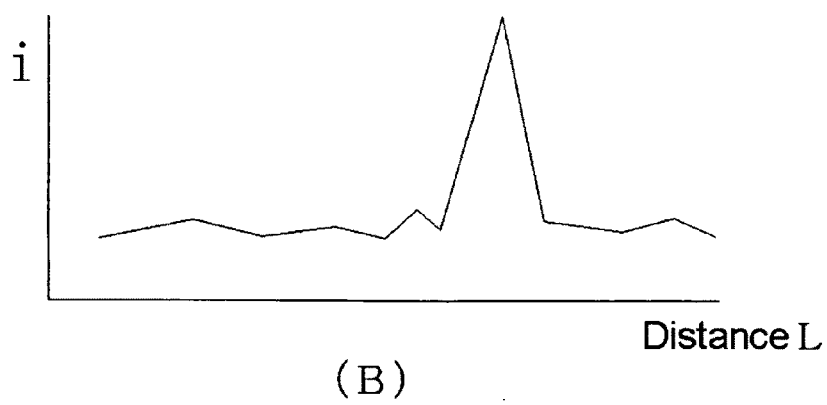
(B)

DISTANCE MEASURING SYSTEM

TECHNICAL FIELD

This invention relates to a distance measurement system for measuring the distance between a laser light source and a distance detector or the distance between position detectors that are used for measuring a ground deformation by an earthquake or for location survey in civil engineering and architecture fields with a high degree of accuracy.

BACKGROUND ART

A distance measurement device for measuring the spatial distance by using a laser light is known.

For example, as shown in FIG. 14, in a distance measuring apparatus 7, an optical modulator 72 modulates a laser light from a laser light source 71 and outputs a modulated light B01, and B01 illuminates a distance measurement object O through a half-mirror 73. The reflected light B11 is detected by a photodetector 74 and is transformed into an electric signal.

A mixer 75 combines a signal from an oscillator 76 for driving the optical modulator 72 and a signal from a local oscillator 77, and a mixer 78 combines the signal from the local oscillator 77 with the signal from the optical detector 74. The phase of the output signal from the mixer 75 is compared with the phase of the output signal from the mixer 78 by a phase comparator 79 and the distance to the distance measurement object O is measured by the phase difference of the signals.

However, since the distance measuring apparatus 7 detects the phase there is uncertainty of integer times of 2π. Therefore if the approximate distance to the distance measurement object O is unknown the distance cannot be determined. Furthermore the electric circuit for detecting phase in the distance measuring apparatus 7 is complicated and expensive.

In the measurement device of FIG. 14, only the distance between the laser light source 71 and the distance measurement object O can be measured and the laser light path needs to be changed in order to measure the distance between the laser light source 71 and other distance measurement objects. It is practically impossible to measure the distance to plural distance measurement objects simultaneously using the laser light source 71.

Therefore we have proposed a distance measurement technique for detecting the path length difference of two light paths with a high degree of accuracy by TPA (Two-Photon Absorption) using two laser light sources with different frequencies modulated by the same frequency (see IEEE Photonics Technology Letters vol. 17 No. 12 pp 2682-2684, December 2005).

By using this distance measurement technique, the path length difference of two optical paths can be detected as a sine wave cycle of the detected signal when the modulation frequency is swept.

However, the optical modulators (formed by LN substrates) and optical wavelength filters in use of these distance measurement techniques have complicated structures and are expensive.

The object of the present invention is to provide a distance measurement system with a simple configuration at a low cost for simultaneously measuring the distance between a laser light source and plural points or the distance between two points using a laser light source with a high degree of accuracy.

DISCLOSURE OF INVENTION

A distance measurement system according to the present invention is characterized by the followings.
(1) A distance measurement system comprising
    a light source,
    plural distance detectors located on the path that is formed as a serial structure, a tree-shaped structure or a radial array in the space starting from the laser light source,
    a photodetector for detecting the light returned through the path, and
    a distance measuring apparatus for measuring the distance between the laser light source and each distance detector by analyzing the light detected by the photodetector, wherein
    each of the distance detectors returns part of the input light from a starting point side distance detector to the starting point side distance detector by reflection or both of reflection and refraction, sends the remaining part of the light to a forefront side distance detector by transmission, reflection, refraction or a combination thereof, and returns the light returning from the forefront side distance detector to the photodetector through the starting point side distance detector by transmission, reflection, refraction or a combination thereof.

The conventional distance measurement techniques by the time-of-flight method or the light modulation method (see FIG. 14) can be used for the distance detection by the distance detector.

According to the present invention, the monitor station at the output side of the laser light source can include a reference detector and the distance measuring apparatus can detect the distance between this reference detector and other distance detector.

The distance measuring apparatus can detect the distance between the detectors from the frequency component corresponding to the reference detector and the frequency component corresponding to other distance detector.

If the initial position (coordinate) is known, the position (coordinate) after the displacement by e.g. an earthquake can be easily determined by determining the distance displacement for each distance detector (the displacement of the distance between two detectors) according to the present invention.

The distance measurement technique proposed by the inventors (IEEE Photonic Technology Letters vol. 17 No. 12 pp 2682-2684, December 2005) using two laser light sources of different frequencies modulated by the same modulation frequency and a Two-Photon Absorption photodetector can be applied to the present invention.

(2) A distance measurement system according to (1), wherein the light heading the forefront side distance detector from the starting point side distance detector over the path is spatially separated from the light returning from the forefront side distance detector to the starting point side distance detector over the path.

(3) A distance measurement system according to (1), wherein the light heading the forefront side distance detector from the starting point side distance detector over the path is spatially overlapped with the light returning from the forefront side distance detector to the starting point side distance detector over the path.

(4) A distance measurement system according to (1) or (2), wherein the distance detector includes an optical component comprising a corner reflector for returning the input light from the starting side distance detector to the distance detector and/or a corner reflector for returning the input light from the forefront side distance detector to the starting point side distance detector through a semitransparent mirror or a total reflection mirror.

(5) A distance measurement system according to either one of (1) through (4), wherein the distance detector at the terminal end of the path returns the entire input light from the starting point side distance detector to the photodetector through the starting point side distance detector by reflection.

(6) A distance measurement system according to either one of (1) through (5), further comprising a transmitter for sending a detection result by the distance detector, wherein at least one of the distance detectors includes an optical axis adjustor, the optical axis adjustor includes a receiver for receiving the detection result from the transmitter and a controller for controlling the optical component so that the light output toward the forefront side distance detector illuminates the light receivable zone of the distance detector, and/or the light output by the starting point side distance detector illuminates the light receivable zone of the optical axis adjustor.

(7) A distance measurement system according to (6), wherein the optical component is controlled so that the light output by the starting point side distance detector illuminates the light receivable zone of the optical axis adjustor when the distance detector is located at the terminal end of the path.

(8) A distance measurement system according to either one of (1) through (7), wherein the controller comprises an optical axis direction adjusting mechanism for controlling the direction of the output optical axis and/or the input optical axis, and/or an optical axis position adjusting mechanism for controlling the output optical axis so that the optical axis moves on the vertical plane without changing the direction of the optical axis while the optical axis maintains its direction.

(9) A distance measurement system according to either one of (6) through (8), wherein the controller controls the input and the output of the distance detector independently.

(10) A distance measurement system according to either one of (1) through (9), wherein at least part of the path is open to the air, at least one partial path is included in the entire path, the partial path is formed by an optical fiber light path between the plural distance detectors and has no distance detector therein, and the end of the optical fiber light path is open to the air through a fiber collimator which can function as a distance detector.

(11) A distance measurement system according to either one of (1) through (10), comprising a photodetector;

a modulator for generating a modulation signal;

a reference laser light source for generating a laser light with a wavelength which is different from the wavelength generated by the laser light source by receiving the modulation signal;

a first optical amplifier for amplifying the laser light that is output from the laser light source and is returned through the light path by reflection;

an optical coupler for combining the laser light from the first optical amplifier with the laser light from the reference laser light source;

a second optical amplifier for amplifying the laser light from the optical coupler; and a photodetector for receiving the laser light from the second optical amplifier and generating an electrical output by Two-Photon Absorption; the distance measuring apparatus comprises a frequency detector for detecting a frequency component corresponding to the reflection position of the light returning by reflection through the light path of the laser light source by extracting a sine wave component which is included in the output signal of the photodetector and a controller for controlling the modulator.

The aforementioned distance measurement technique proposed by the inventors of this patent application (IEEE Photonic Technology Letters vol. 17 No. 12 pp 2682-2684, December 2005) requires an optical intensity modulator for multiplexing the lights from two laser light sources and an optical wavelength filter for separating them. Such an optical intensity modulator and an optical wavelength filter are not necessary for the distance measurement system of (11).

Although the distance measurement system of (11) directly modulates two laser lights by the voltage-frequency converter, this system has a simple structure and can be less expensive because it does not need to use a LN substrate.

BRIEF DESCRIPTION OF DRAWINGS

FIG. 2(A) shows an arrangement of plural distance detectors on the path spatially formed in a tree-shaped structure starting from a laser light source, and (B) shows an arrangement of plural distance detectors on the path spatially formed in a radial structure starting from a laser light source.

FIG. 9(A) is an explanatory diagram of the distance detector in case of the path P formed on a straight line, and (B) shows an explanatory diagram of the distance detector in case of the path P formed in a radial structure.

FIG. 12(A) is a block diagram showing the fifth embodiment of the present invention, and (B) shows a spectrum chart for the detected component of the reflected light.

According to the present invention, it is possible to simultaneously measure the distance between a laser light source and plural points (the distance between a laser light source and distance detectors) or the distance between the adjacent distance detectors on a path at a high degree of accuracy.

Especially, this invention is useful for a high accuracy distance measurement or a deformation measurement in civil engineering and architecture fields, like a measurement of the ground deformation by an earthquake, measurement of the drilled tunnel length in a tunneling work or a location survey in a building under construction.

IMPLEMENTATION EXAMPLE FOR CARRYING OUT THE INVENTION

Figure 1:
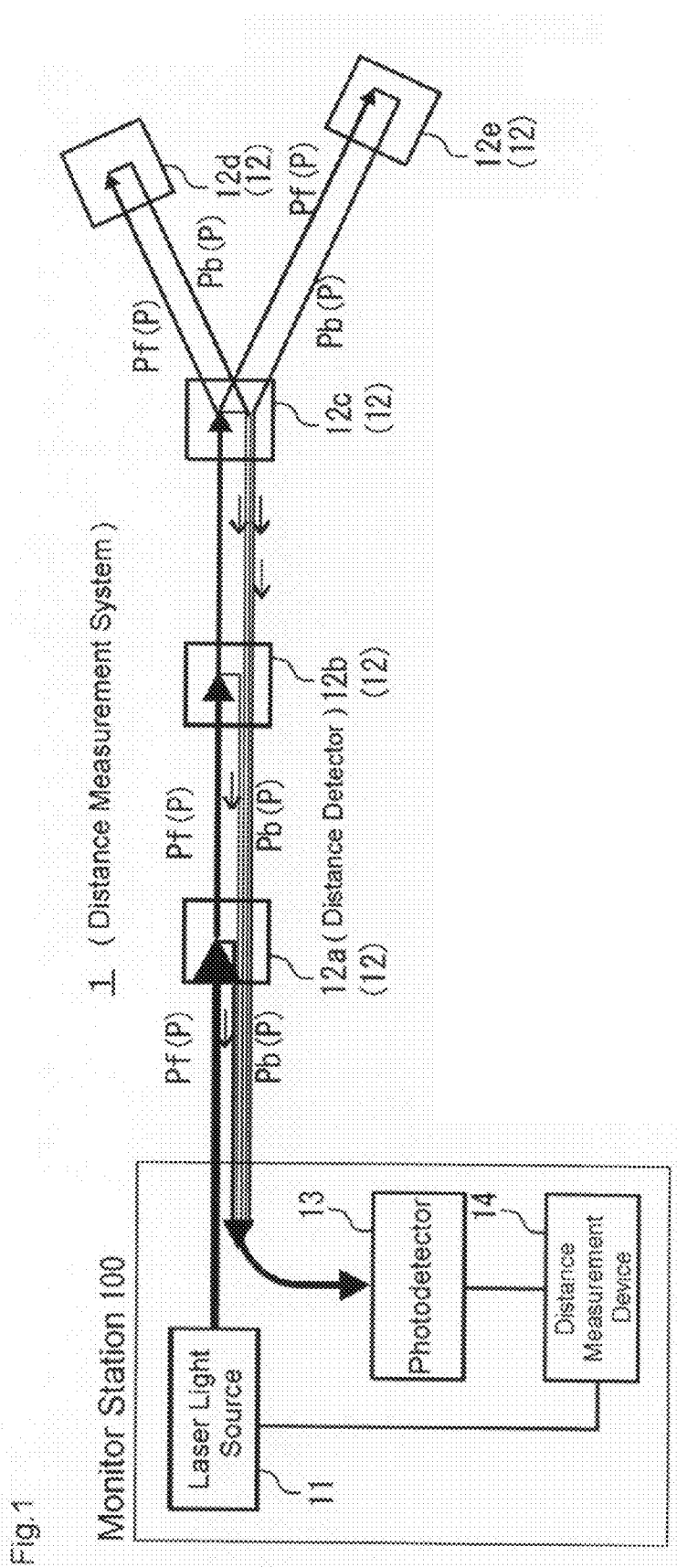
FIG. 1 shows a basic configuration of a distance measurement system according to the present invention.

A distance measurement method according to the present invention will be explained referring to FIG. 1. In FIG. 1, a distance measurement system 1 includes a laser light source 11, a distance detector 12, a photodetector 13 and a distance measurement device 14. In FIG. 1, the laser light source 11, the photodetector 13 and the distance measurement device 14 are located in a monitor station 100.

It shows an arrangement of distance detectors (five detectors shown with the reference numerals 12a, 12b, 12c, 12d and 12e in FIG. 1) in a tree shape structure (forming branches originated from the laser light source 11).

Plural distance detectors 12 can be located on the paths P spatially arranged in a tree shape structure or in a radial pattern structure originated from the laser light source 11 as shown in FIG. 2(A), (B). The distance detectors are shown by Tn (n=1, 2, 3, . . . ) in FIG. 2(A), (B). The path P can be formed by a single beam or double beams having the approach leg and the return leg that are spatially apart.

The distance detector 12 can comprise a prism, a corner reflector and a semitransparent mirror at the branch point.

An optical component integrally formed by a combination of part or all of a prism, a corner reflector, a semitransparent mirror and a total reflection mirror can be used as the distance detector 12 (12a, 12b, 12c, 12d and 12e in FIG. 1).

The distance detector 12b returns part of the input light from the distance detector 12a which is positioned at the starting point side to the distance detector 12a by reflection (or both reflection and refraction) and sends the remaining part of the input light to the distance detector 12c, 12d and 12e by transmission, reflection or refraction (or a combination thereof).

The distance detector 12b returns the light returned from the distance detectors 12c, 12d and 12e to the photodetector 13 through the distance detector 12a by transmission, reflection or refraction (or a combination thereof).

The path Pf heading the distance detectors 12d and 12e from the starting point (the laser light source 11) through the distance detectors 12a and 12b can be spatially separated from the path Pb returning to the starting point from the distance detectors 12d and 12e through the distance detectors 12a and 12b.

In this case, the distance detector 12b can include a corner reflector for returning the input light from the distance detector 12a to the distance detector 12a.

More specifically, the distance detector 12a and the distance detector 12b can be configured by optical components integrally formed with a corner reflector C, a semitransparent mirror H and a prism PR as shown in FIGS. 3(A) and (B).

Figure 4:
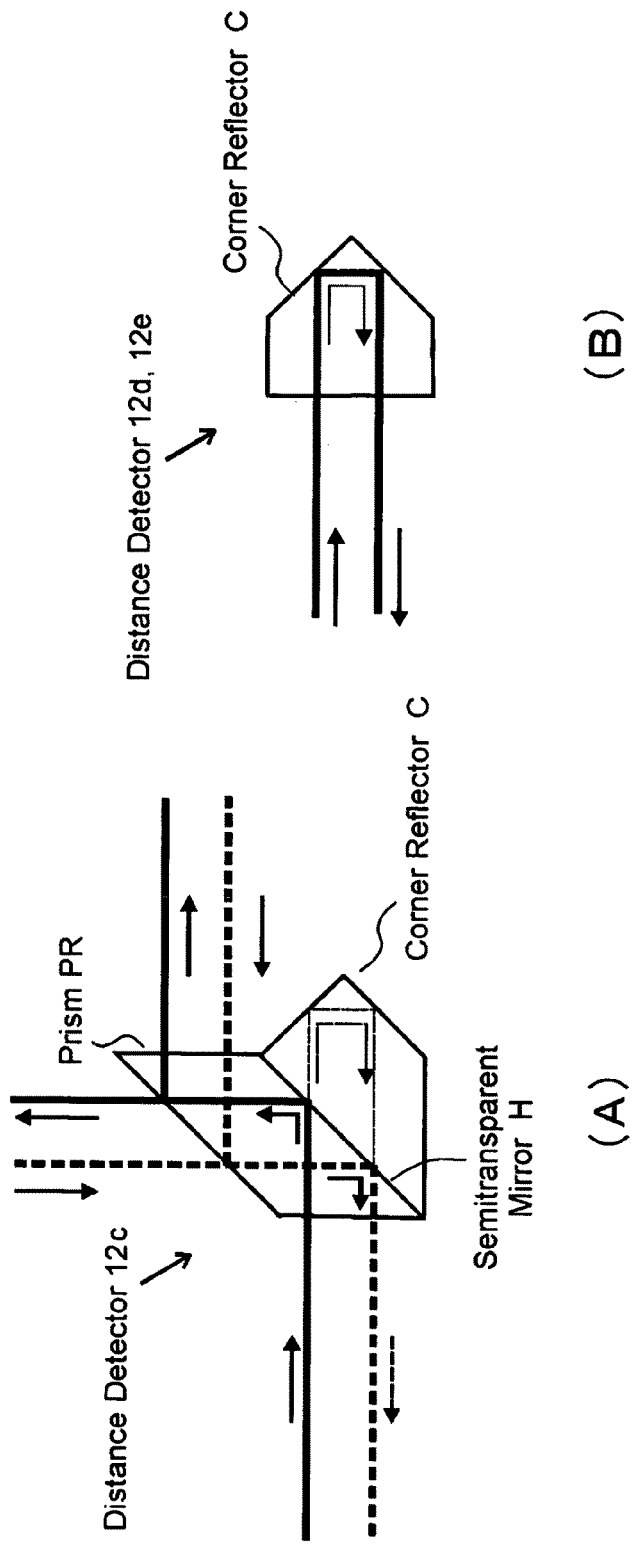
FIG. 4(A) (B) shows another exemplary configuration of the distance detector.

The distance detector 12c can also be configured by optical components integrally formed with a corner reflector C, a semitransparent mirror H and a prism PR as shown in FIG. 4(A).

The distance detector 12d and the distance detector 12e can be configured by a corner reflector C as shown in FIG. 4(B) The photodetector 13 detects the light coming back through the path P.

The distance measurement device 14 measures the distances between the starting point (laser light source 11) and the distance detectors 12a, 12b, 12c, 12d and 12e respectively by analyzing the lights detected by the photodetector 13.

According to the present invention, the distance detectors and the optical components arranged on the path can be configured with a combination of a demultiplexer, a multiplexer, an optical waveguide device, a fiber coupler, a lens, a semitransparent mirror, etc.

Figure 5:
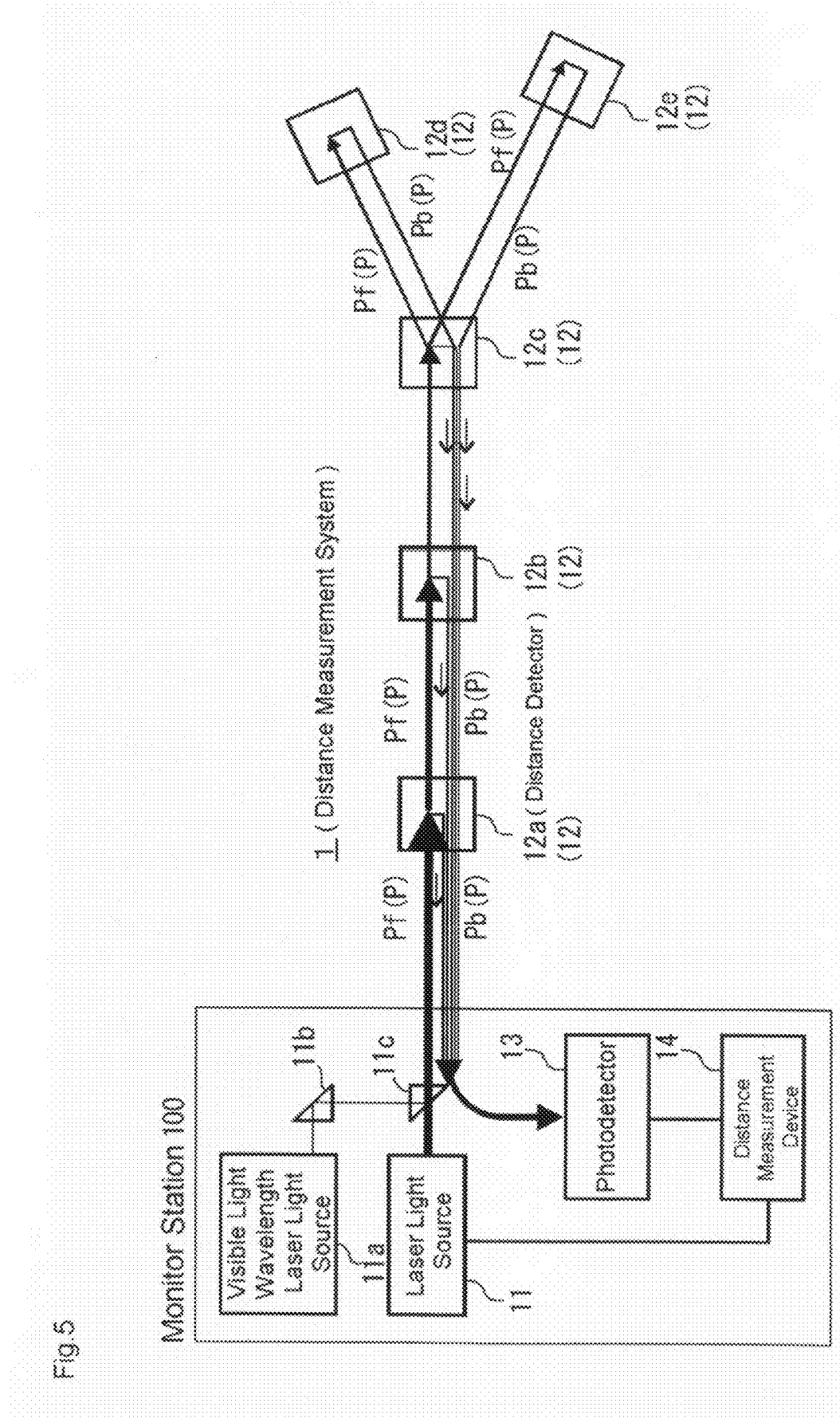
FIG. 5 shows an exemplary configuration by adding a visible wavelength laser light source to the distance measurement system 1 shown in FIG. 1 detector.

FIG. 5 shows an example of a modified system of the distance measurement system 1 by adding a visible light wavelength laser light source 11a and prisms 11b and 11c. If laser light generated by the laser light source 11 is invisible, the laser light source 11 is replaced by a visible light wavelength laser light source 11a when the distance measurement system 1 is installed or the path P is changed.

According to this configuration, workmen can adjust the position and the direction of the distance detector 12 using the visible laser light from the laser light source 11a.

EMBODIMENT

First Embodiment

Figure 6:
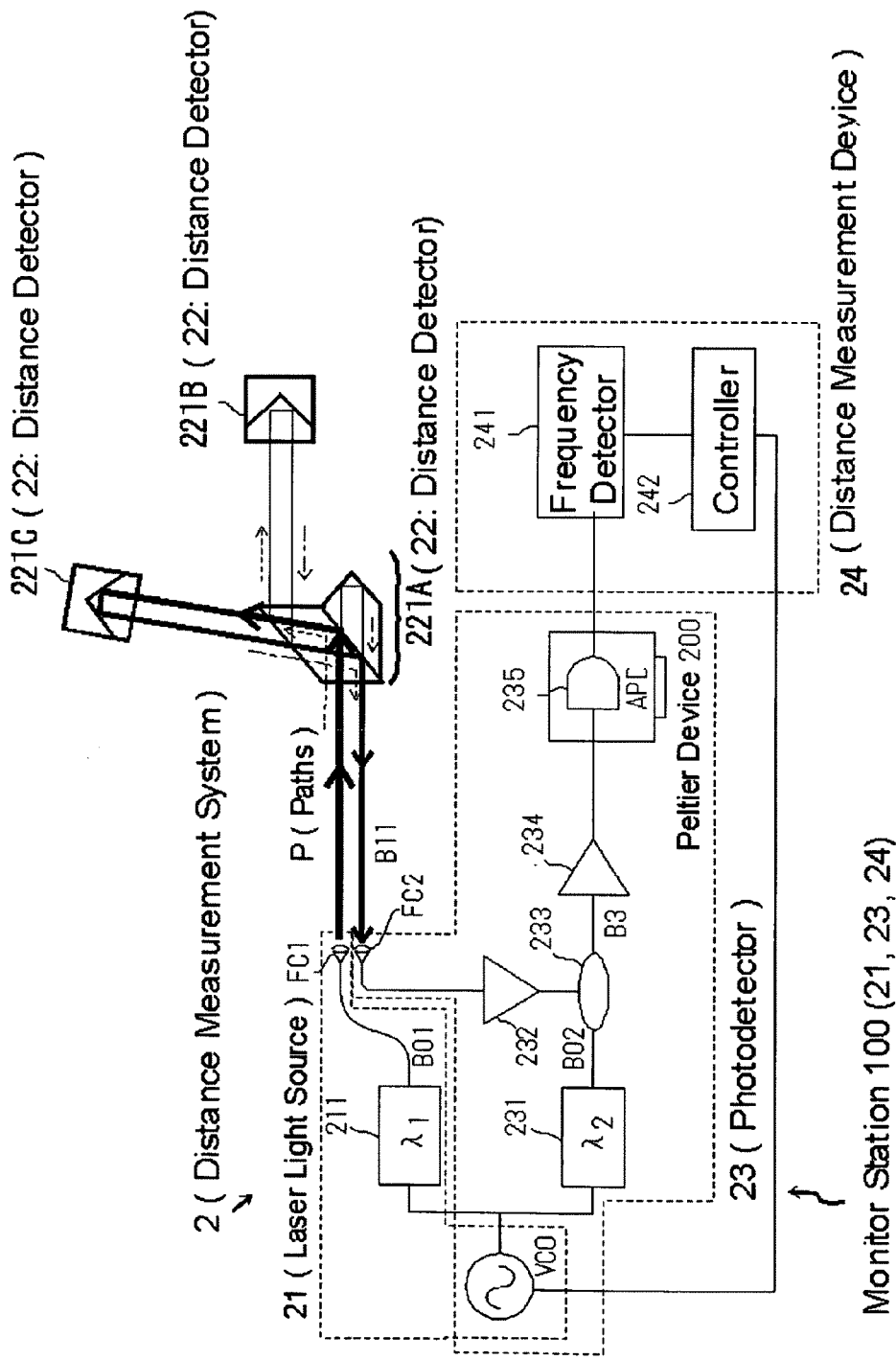
FIG. 6 is a block diagram showing the first embodiment of the present invention.

FIG. 6 is a block diagram showing the first embodiment of the present invention. The distance measurement system 2 shown in FIG. 6 comprises a laser light source 21, a distance detector 22, a photodetector 23 and a distance measurement apparatus 24.

In this embodiment, a photodetector 235 receives the laser light B3 from a second optical amplifier 234 and induces Two-Photon Absorption (TPA).

The laser light source 21 includes a semiconductor laser 211 and a fiber collimator FC1, and the fiber collimator FC1 is the starting point of the path P in this embodiment. In this embodiment, the light from the semiconductor laser 211 (the first laser light source) is directly modulated by a VCO (Voltage Controlled Oscillator, controlled by a controller 242).

In FIG. 6, three distance detectors (each includes an optical component) on the path P are shown with the reference numerals 221A, 221B and 221C.

Actually, the length of the path P between the starting point and the farthest distance detector would be from several tens meters to several kilometers. The number of distance detectors 22 formed on the path P is two or more (can be several tens, for example).

The photodetector 23 comprises a fiber collimator FC2, a reference semiconductor laser (the second laser light source) 231, a photo coupler 233, a first optical amplifier 232, a second optical amplifier 234 and a photodetector 235.

The fiber collimator FC2 can receive the light returned through the path P. The light from the reference semiconductor laser 231 is directly modulated together with the light from the semiconductor laser 211 simultaneously by the aforementioned VCO. The semiconductor laser 211 generates the laser light B01 with the wave length $\lambda_1$ that is different from the wavelength $\lambda_2$ of the laser light B02 generated by the reference semiconductor laser 231.

In this embodiment, the wavelength $\lambda_1$ of the semiconductor laser 211 is 1550 nm and the wavelength $\lambda_2$ of the reference semiconductor laser 231 is 1552 nm. The semiconductor laser 211 and the reference semiconductor laser 231 are swept by a signal having a predetermined modulation frequency (e.g. 50 k steps between 1 MHz and 100 MHz) generated by the VCO.

The first optical amplifier 232 can amplify the reflected light B11 that is returned through the light path P and received by the fiber collimator FC2. This reflected light B11 includes the lights that are returned by reflection at the distance detectors 22A, 22B and 22C. Although it is not shown in the drawing, a band-pass filter can be added to the subsequent stage of the first optical amplifier 232.

The optical coupler 233 receives the laser light B02 from the reference semiconductor laser 231 and the laser light B11 from the first optical amplifier 232, and combines them and outputs as a laser light B3.

The second optical amplifier 234 amplifies the laser light B3 from the optical coupler 233. Although it is not shown in the drawing, a band-pass filter can be added to the subsequent stage of the second optical amplifier 234 in order to remove the Amplified Spontaneous Emission (ASE).

The photodetector 235 receives the laser light B3 from the second optical amplifier 234, and Two-Photon Absorption (TPA) is induced. The photodetector 235 can be configured by an avalanche photodiode (APD) to receive the laser light from the second optical amplifier 234 and induce Two-Photon Absorption (TPA).

It is preferable to maintain the temperature of the photodetector 235 at a predetermined temperature by a temperature control device (Peltier device 200) to make the SN ratio larger.

The distance measurement device 24 can be configured by a frequency detector 241 and a controller 242. The frequency detector 241 can comprise a dedicated processor, and detects the frequency component corresponding to the reflection position of the light returning through the path P by extracting a sine wave included in the output signal (electric signal) provided by the photodetector 235.

More specifically, the controller 242 can display the detection result detected by the frequency detector 241 on a display device. The controller 242 may include the functionality of the frequency detector 241. The controller 242 controls the VCO that is connected to the semiconductor laser 211 and the reference semiconductor laser 231.

By using the distance measurement system 2 according to this embodiment, it is possible to detect the distances between the starting point and the distance detectors 22A, 22B and 22C accurately, e.g. within an error of several millimeter order for a distance variation of 1000 m.

Second Embodiment

Figure 7:
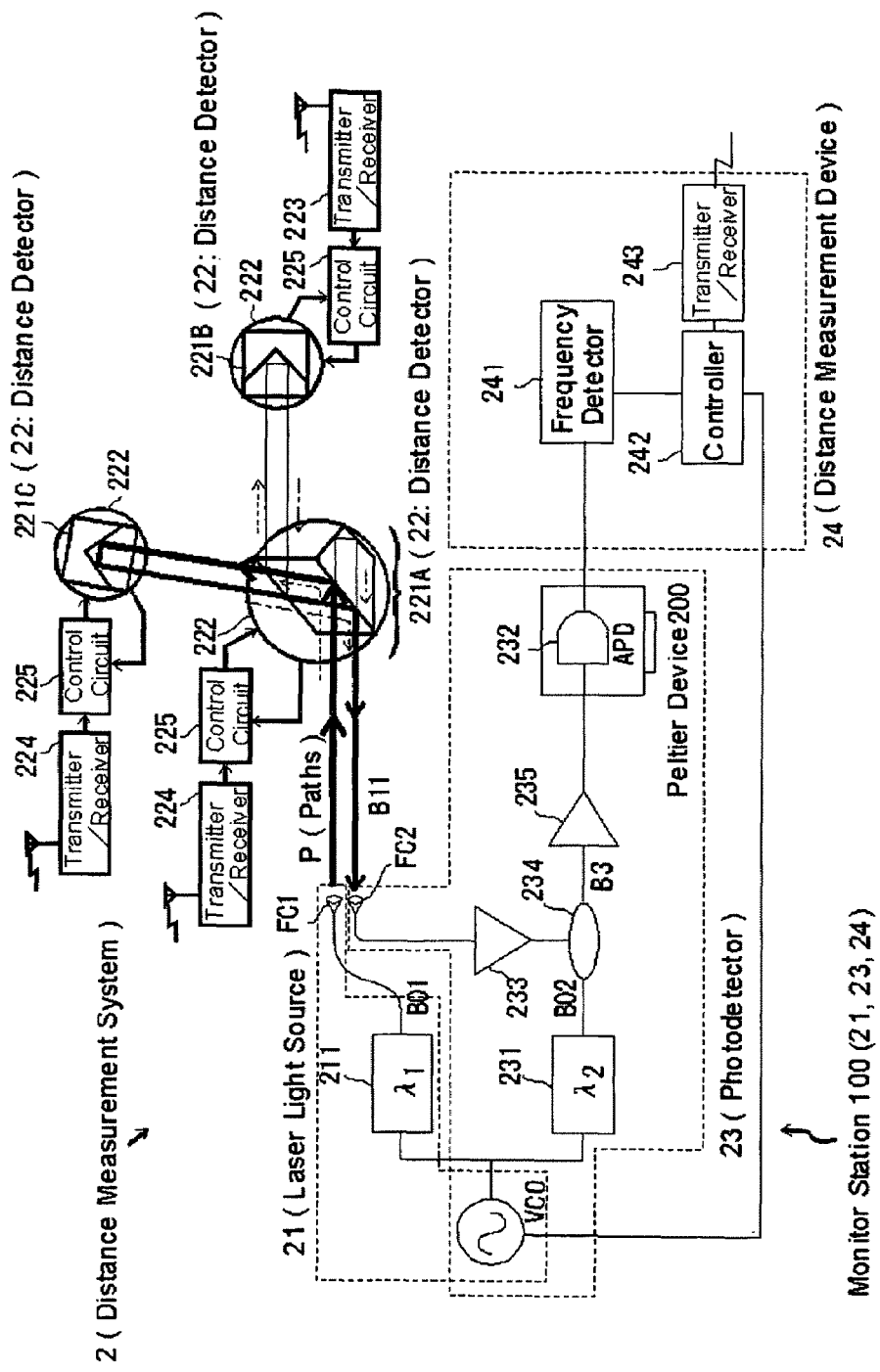
FIG. 7 is a block diagram showing the second embodiment of the present invention.

FIG. 7 shows the distance measurement system 2 having an optical axis adjuster.

Figure 8:
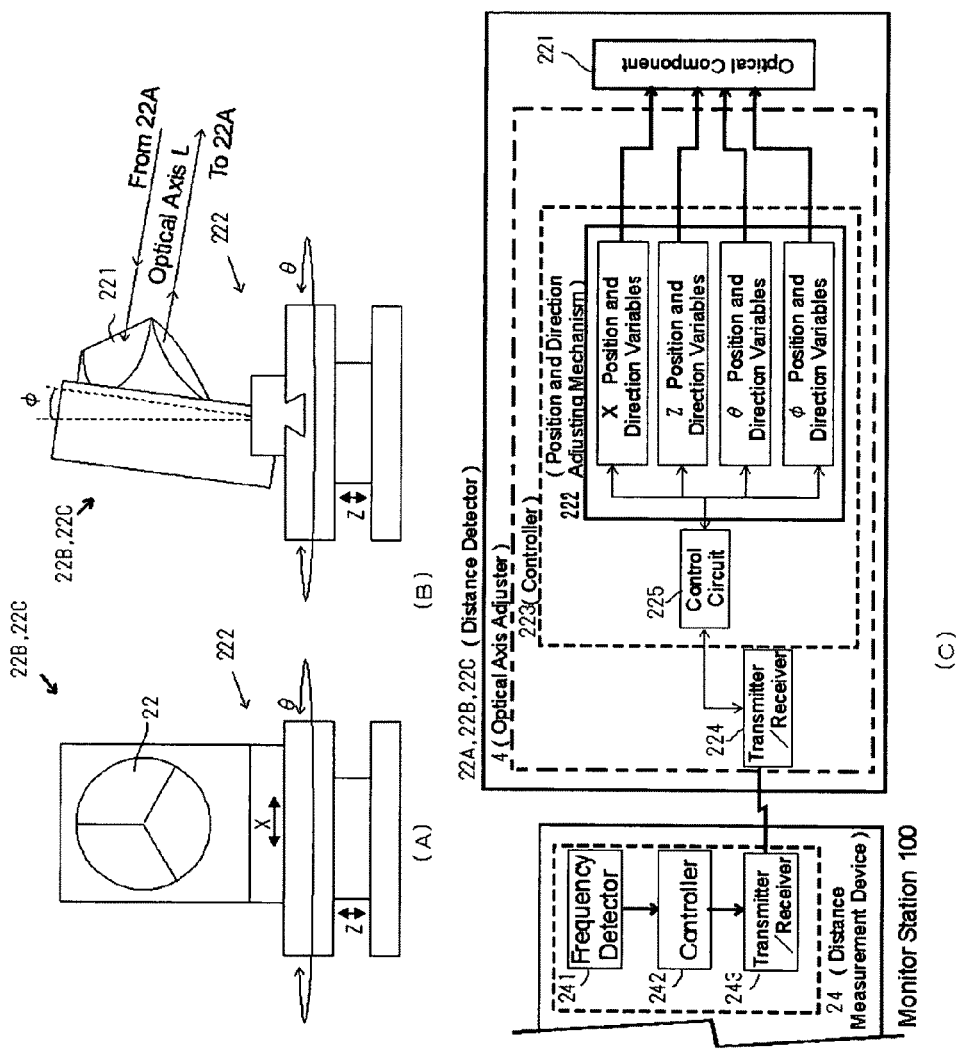
FIG. 8(A) shows a front view of the distance detector, (B) shows a side view of the distance detector, and (C) is a block diagram showing a schematic view of the optical axis adjustor.

As shown in FIG. 8(C), an optical axis adjuster 4 comprises a controller 223 and a transmitter/receiver 224 arranged in the distance detectors 22A, 22B and 22C.

The controller 223 comprises a control circuit 225 and an adjusting mechanism 222 for adjusting position and direction of the distance detectors 22A, 22B and 22c. The optical axis adjuster 4 and the controller 223 in FIG. 7 are shown without reference numerals.

As shown in FIG. 8(C), the controller 242 in the distance measurement apparatus 24 located in the monitor station 100 provides the detection result (light intensity) obtained by the frequency detector 241 to the transmitter/receiver 243, and the transmitter/receiver 243 provides it to the transmitter/receiver 244 in the distance detectors 22A, 22B and 22C.

The control circuit 225 controls the position and direction adjusting mechanism 222 by comparing a detected result (light intensity) received by the transmitter/receiver 224 so that the optical component 221 is controlled by the position adjusting mechanism 222 so as to control the direction of the optical axis L to obtain the highest intensity.

In this embodiment, the control circuit 225 can control the position and direction variables X, Z, θ, φ of the optical component 221 shown in FIGS. 8(A) and (B) by driving the position and direction adjusting mechanism 222 (FIG. 8(C)). The control of θ and φ are realized by an actuator using a well-known piezo device, etc. and the control of X and Z are realized by a motor mechanism, etc.

In order to facilitate an explanation, FIGS. 8(A) and (B) shows an example of the distance detectors 22B and 22C having a corner reflector as the optical component 221.

By using the optical axis adjusting device 4 shown in FIG. 8(C), the controller 223 in the distance detector 22A can control the optical component 221 so that the lights being output toward the distance detectors 22B and 22C illuminate the receivable zone of these distance detectors, and/or the lights being output from the distance detectors 22B and 22C illuminate the receivable zone of the distance detector 22A.

When the distance detectors 22B and 22C are located at the terminal end of the path P as shown in FIG. 7, the controller 223 in the optical axis adjusting device 4 in FIG. 8(C) can control the optical component 221 so that the light being output toward the distance detector positioned at the starting point side (22A in FIG. 8(C)) illuminates the receivable zone of the distance detector 22A.

By using the distance measurement system 2 according to this embodiment, it is possible to measure the accurate distances between the starting point and the distance detectors 22A, 22B and 22C.

In the distance measurement system 2 of FIG. 6 and FIG. 7, when a linear path P is formed, a triangular pyramid shape corner reflector formed by gluing three glass plates on the three sides of a triangular pyramid respectively can be used as the distance detector as shown in FIG. 9(A). An antireflection film F is pasted on the plates of this optical component at a side the light outputs. In FIG. 9(A), the above-mentioned corner reflectors are shown by the reference numerals 22A and 22B. A corner reflector formed by conventional bulk glass is shown by the reference numeral 22C.

When a radial patterned path P is formed, as shown in FIG. 9(B), the output light originated from the laser light source 21 can be branched by a beam splitter SPL, and the returned light through the path P can be combined by an optical coupler CPL and processed by the photodetector 23.

Third Embodiment

Figure 10:
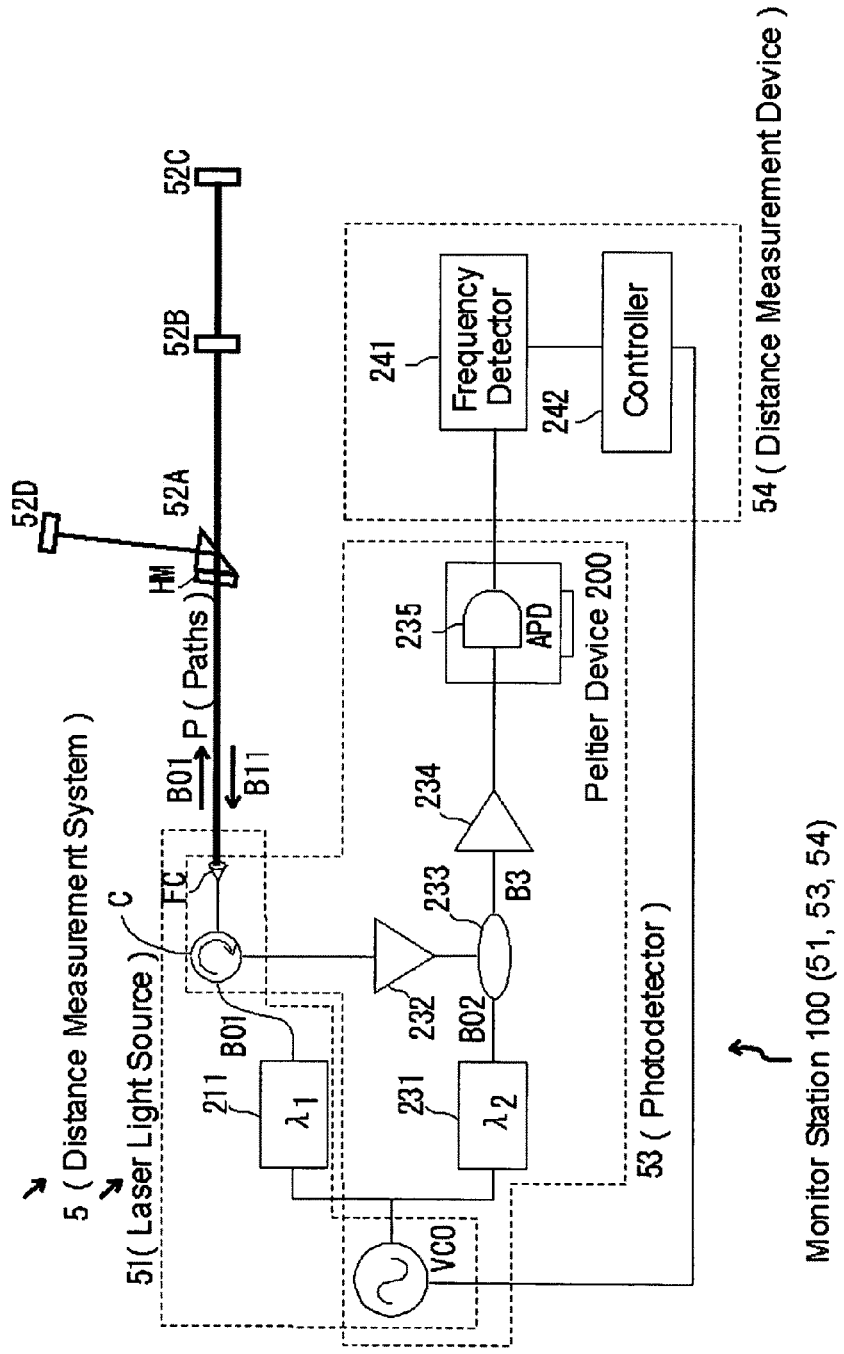
FIG. 10 is a block diagram showing the third embodiment of the present invention.

FIG. 10 is a block diagram showing the third embodiment of the present invention comprising a single beam system. The distance measurement system 5 shown in FIG. 10 comprises a laser light source 51, a distance detector 52, a photodetector 53 and a distance measuring apparatus 54.

The laser light source 51 includes a semiconductor laser 211. In this embodiment, a fiber collimator FC is mounted at the subsequent stage of the circulator C. The fiber collimator FC functions as the starting point of the path P as well as the inlet for the light coming back through the path P.

The distance detectors 52A, 52B, 52C and 52D are positioned on the way of the path P starting at the position of the fiber collimator FC or the circulator C.

The distance detector 52A comprises a prism, on which a semitransparent mirror H is formed at the starting point side of the path P. The distance detector 52A reflects part of the light to the fiber collimator FC, and transmits the remaining part of the light, and then splits it so that each of the split lights is directed to the distance detector 52B and the distance detector 52D respectively.

The distance detector 52B comprises a semitransparent mirror, and reflects part of the light toward the fiber collimator and transmits the remaining part of the light toward the distance detector 52C. The distance detectors 52C and 52D comprise a total reflection mirror.

The configuration of the photodetector 53 is similar to that of the photodetector 23 shown in FIG. 6 except for that the photodetector 53 receives the light returning on the path P through the fiber collimator FC and the circulator C. The configuration of the distance detector 54 is identical to that of the distance detector 24.

The distance measurement system 5 can measure the distances between the starting point and the distance detector 52A, 52B, 52C and 52D as well as the distance measurement system 2 shown in FIG. 6.

Although it is not shown in the drawing, an optical axis adjustor that is similar to the optical axis adjustor 4 shown in FIG. 7 can be incorporated in the distance measurement system 5.

Fourth Embodiment

Figure 11:
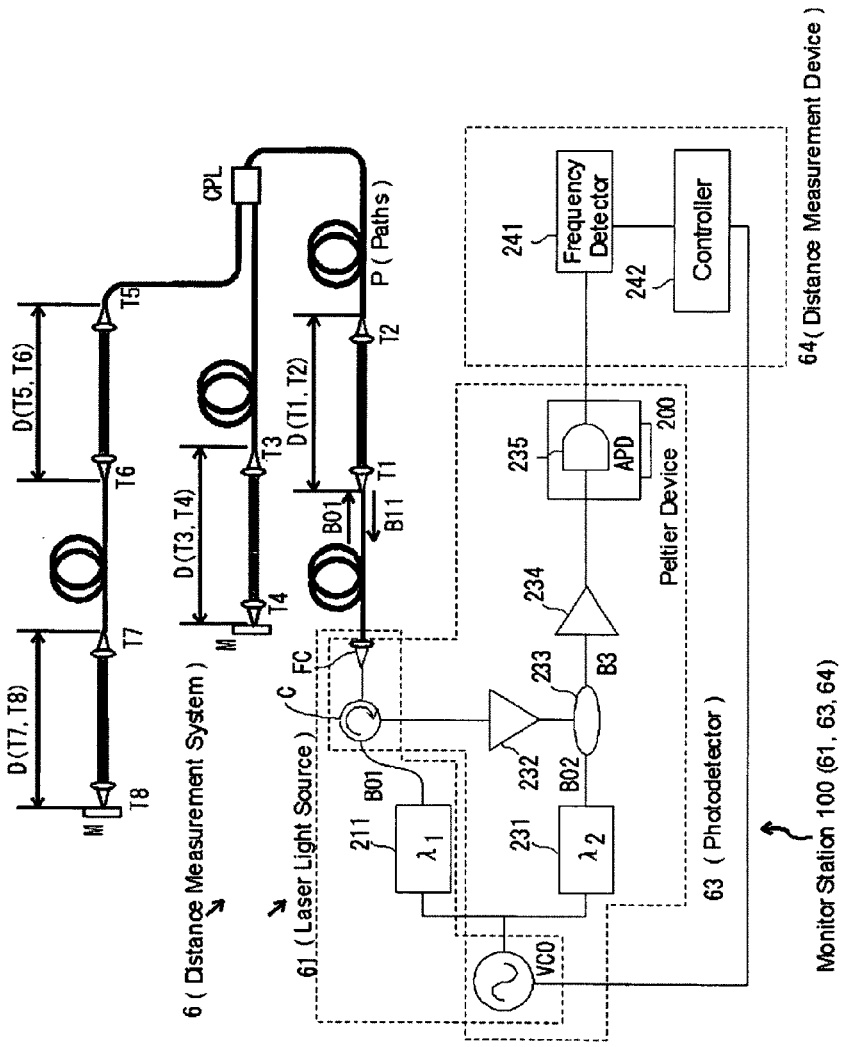
FIG. 11 is a block diagram showing the fourth embodiment of the present invention.

FIG. 11 is a block diagram showing the fourth embodiment of the present invention. The distance measurement system 6 shown in FIG. 11 comprises a laser light source 61, a distance detector 62, a photodetector 63 and a distance measuring apparatus 64.

The configuration of the laser light source 61, the photodetector 63 and the distance measuring apparatus 64 shown in FIG. 11 is identical to that of the laser light source 51, the photodetector 53 and the distance measuring apparatus 54 shown in FIG. 10 respectively.

In this embodiment, part of the path P is open to the air and the remaining part of the path is formed by optical fibers. The end faces (T1, T2, T3, T5, T6 and T7) of the optical fibers connected to the fiber collimators function as semitransparent mirrors, and reflection mirrors M is formed at the terminal end faces of the path P (T4, T8 in FIG. 11). In this embodiment, the end faces T1 through T8 function as distance detectors. The path heading the forefront side from T2 is split into two paths by the light splitter (optical coupler) and connected to the fiber collimators at T3 and T5.

In FIG. 11, the path between FC and T1, the path between T2 and T3, the path between T2 and T5 and the path between T6 and T7 constitute partial paths. The partial paths comprise no distance detector on its way.

The distance measurement system 6 according to this embodiment can accurately measure the distance between T1 and T2, the distance between T3 and T4, the distance between T5 and T6, the distance between T7 and T8 that are open to the air and their displacements.

Fifth Embodiment

FIG. 12(A) is an explanatory drawing showing the fifth embodiment of a distance measurement system of the present invention. In this embodiment, Two-Photon Absorption (TPA) is utilized.

In FIG. 12(A), a distance measurement system 1A comprises a first laser light source 301, a second laser light source 302, an optical coupler 34, a first optical amplifier 351, a second optical amplifier 352, a photodetector 36 and a frequency detector 37.

The first laser light source 301 and the second laser light source 302 can be configured by semiconductor lasers. These laser light sources generate laser lights at different light frequencies. The two laser lights are modulated with the same modulation frequency by a modulator (VCO: Voltage control oscillator).

The first laser light source 301 and the second laser light source 302 generate the laser lights B10 and B20 respectively having a different frequencies each other.

In this embodiment, the frequency of the first laser light source 301 is $f_1$ (wavelength; $\lambda_1$: 1550 nm) and the frequency of the second laser light source 302 is $f_2$ (wavelength $\lambda_2$: 1552 nm). The modulation frequency is swept by step of 50 kHz from 1 MHz to 100 MHz, for example.

A first optical amplifier 351 can amplify the reflected light B11 that is reflected and returned through the light path of the first laser light. Although it is not shown in the drawing, a band-pass filter for filtering the reflected light B11 can be employed between the output terminal of the first optical amplifier 351 and the photo coupler 34.

The photo coupler 34 combines the laser light B20 from the second laser light source 302 with the laser light B11 from the second optical amplifier 351. The second optical amplifier 352 amplifies the laser light B3 from the photo coupler 34. Although it is not shown in the drawing, a band-pass filter for removing the Amplified Spontaneous Emission (ASE) can be arranged at the output stage of the second optical amplifier 352.

The photodetector 36 receives the laser light from the second optical amplifier 352 and Two-Photon Absorption is performed. The photodetector 36 can comprise an avalanche photodiode (APD), for example.

The temperature of the photodetector 36 is controlled to be kept constant so as to maintain the SN ratio by a temperature control device (in this example, Peltier devise 200).

The frequency detector 37 may comprise a dedicated processor and detects the frequency component corresponding to the reflection position of the lights that is reflected and returned through the light path of the first laser light source 301 by extracting a sine wave in the output signal (electric signal) of the photodetector 36.

In FIG. 12(A), the frequency detector 37 is connected to the controller 2. The controller 2 controls the VCO that is connected to the first laser light source 301 and the second laser light source 302.

The frequency detector 37 may comprise a dedicated processor and detects the frequency component corresponding to the reflection position of the lights that was reflected and returned through the light path of the first laser light source 301 by extracting a sine wave included in the output signal (electric signal) of the photodetector 36.

The detected component of the reflected light (current value i) is expressed by $$i \propto i_{bias} + E_1 E_2 \alpha \beta \cos \omega_m (2nL/c)$$

In this expression, $i_{bias}$ is a DC bias value, $E_1$ is the intensity of the light generated by the first laser light source 301, $E_2$ is the intensity of the light generated by the second laser light source 302, $\omega_m$ is the modulation frequency, C is the velocity of light, n is a refractive index and L is the distance between the first laser light source 301 and the reflection position. $\alpha$, $\beta$ are positive numbers that are 1 or less.

The reflection position of the light can be detected by a spectrum chart of the detected components of the reflected light (see FIG. 12(B): it is equivalent to a drawing having the horizontal axis for the distance L to the reflection point).

This distance detection can measure simultaneously the distances to plural distance detectors.

Figure 3:
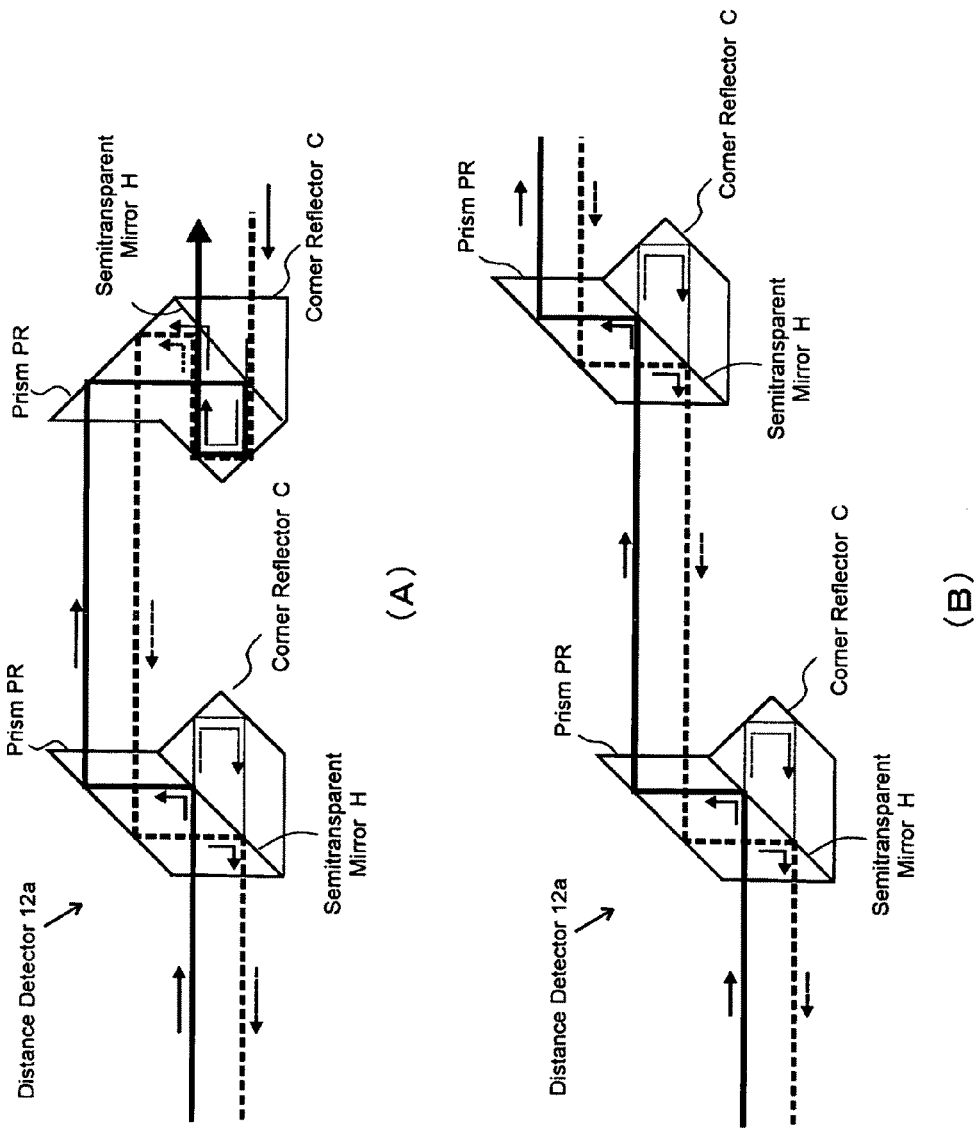
FIG. 3(A) (B) shows an exemplary configuration of the distance detector.

In FIG. 3, the frequency detector 37 is connected to the controller 2. The controller 2 controls the VCO that is connected to the first laser light source 301 and the second laser light source 302.

Sixth Embodiment

Figure 13:
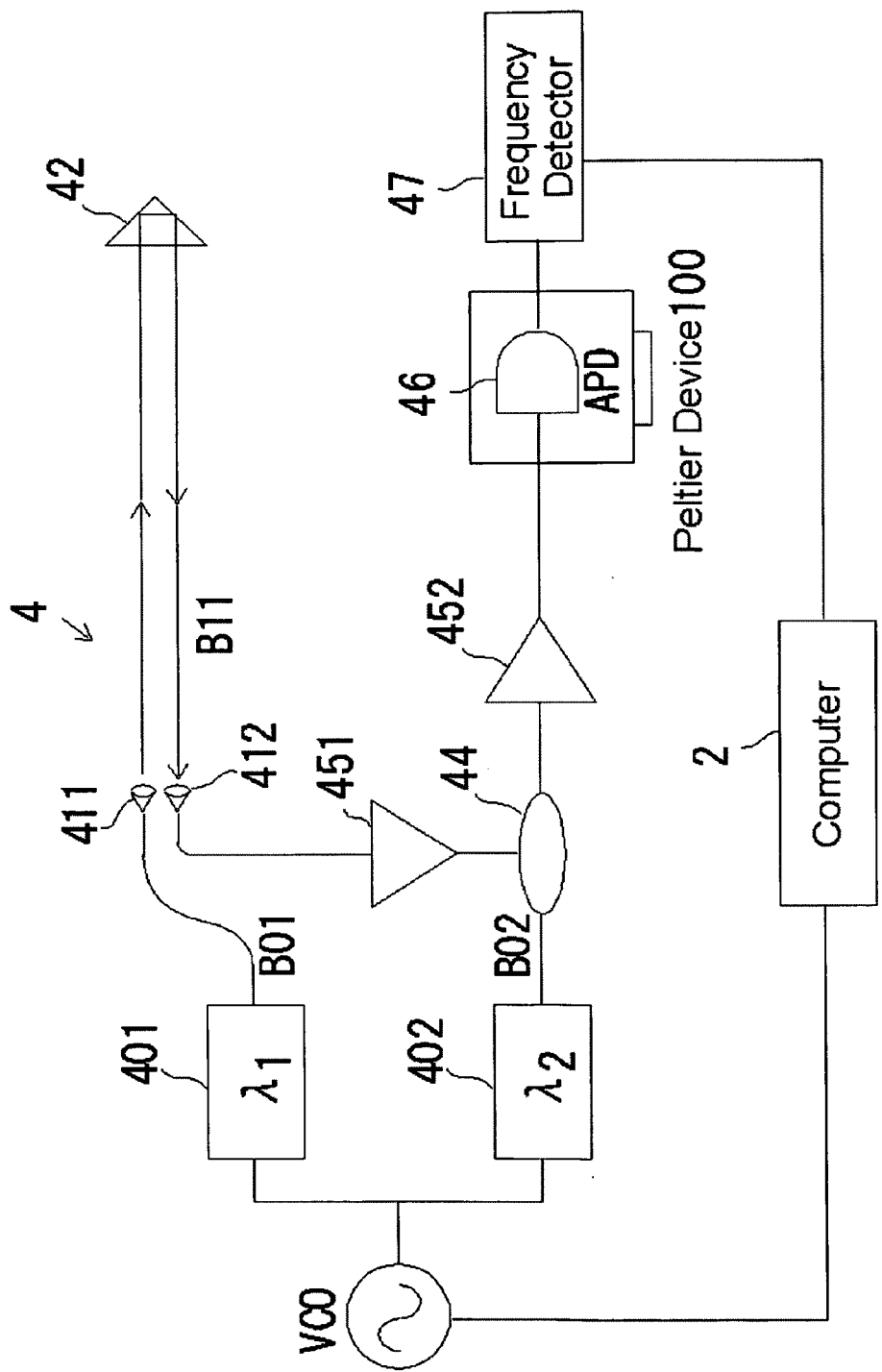
FIG. 13 is a block diagram showing the sixth embodiment of the present invention.
Figure 14:
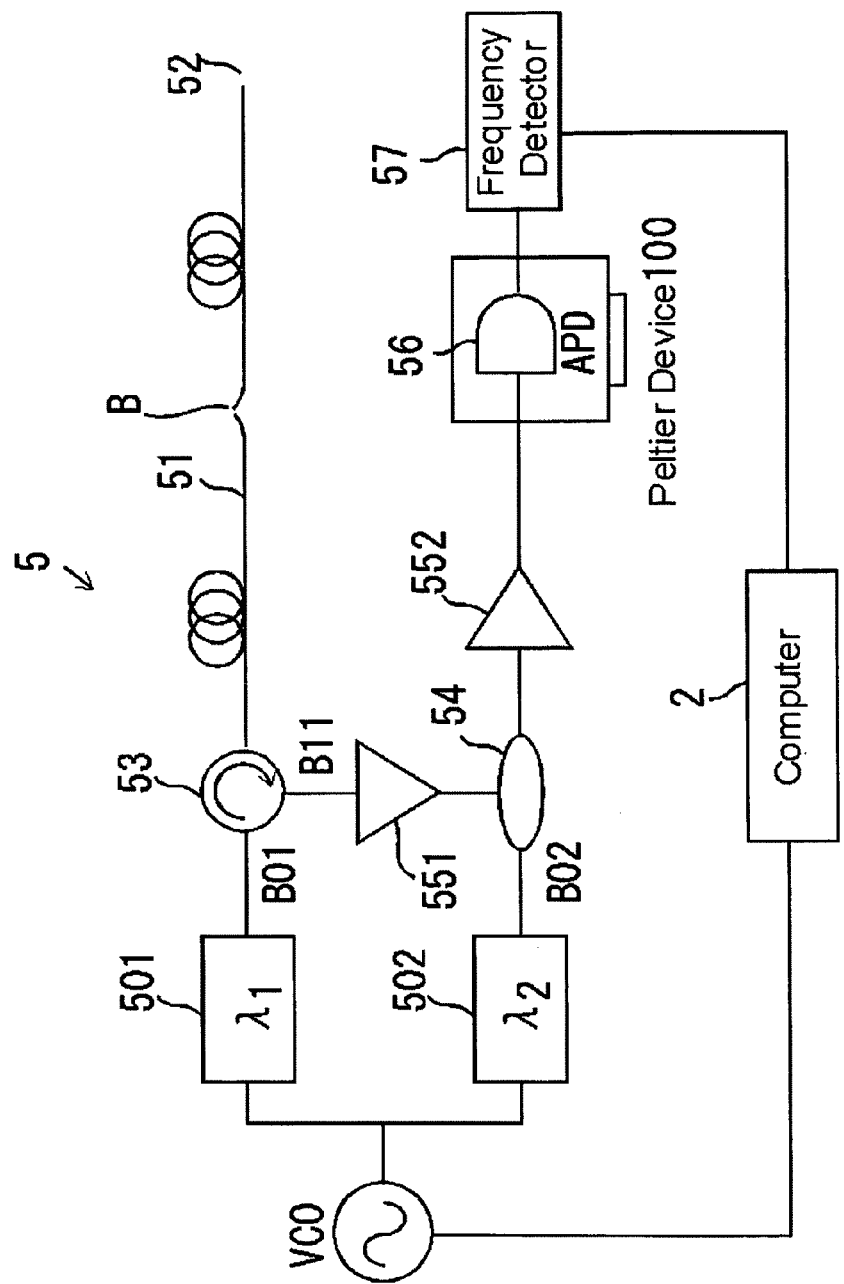
FIG. 14 shows a prior art configuration.

FIG. 13 shows the sixth embodiment of the distance measurement system of the present invention.

In FIG. 13, a distance measurement system 1B is for measuring the distance or the deformation of the distance, and comprises a first laser light source 401, a second laser light source 402, a fiber collimators 411 and 412, a corner reflector 42, a first optical amplifier 451, an optical coupler 44, a second optical amplifier 452, a photodetector 46 and a frequency detector 47.

The semiconductor lasers may be used for the first and second laser light sources 401 and 402. These laser light sources generate laser lights at different frequencies. The two laser lights are modulated with the same modulation frequency by a modulator (VCO: Voltage control oscillator).

The first laser light source 401 and the second laser light source 402 generate the laser lights B10 and B20 with different frequencies respectively.

In this embodiment, the frequency of the first laser light source 401 is $f_1$ (wavelength $\lambda_1$: 1550 nm) and the frequency of the second laser light source 402 is $f_2$ (wavelength $\lambda_2$: 1552 nm). The modulation frequency is swept by step of 50 kHz from 1 MHz to 100 MHz, for example. The corner reflector 42 reflects a laser light generated by the first laser light source 401.

The fiber collimator 411 emits the light provided by the first laser light source 401 toward the corner reflector 42 through the fiber cable. The fiber collimator 412 is provided with the laser light B11 reflected by the corner reflector 42, and provides the reflected laser light B11 to the first optical amplifier 451 via the optical fiber so that the laser light B11 is amplified. The band pass filter, not shown in the drawing, may be arranged at an output terminal of the first optical amplifier 451.

The optical coupler 44 combines the laser light B20 from the second laser light source 402 with the laser light B11 from the fiber collimator 412. The optical amplifier 452 amplifies the laser light B3 from the optical coupler 44. Although it is not shown in the drawings, a band-pass filter for removing the Amplified Spontaneous Emission (ASE) is added to the subsequent stage of the optical amplifier 452.

The photodetector 46 can comprise an avalanche photodiode (APD), for example. The photodetector 46 receives the laser light from the optical amplifier 452 and functions as Two-Photon absorber.

The temperature of the photodetector 46 is maintained constant in order to increase the SN ratio by a temperature control device (in this example, the Peltier devise 100).

The frequency detector 47 extracts a sine wave component included in the output signal of the photodetector 46, and eventually detects a frequency component corresponding to the distance between the laser light source 411 and the corner reflector 42.

In FIG. 13, the frequency detector 47 is connected to the controller 2. The controller 2 controls the Voltage Controlled Oscillator VCO that is connected to the first laser light source 401 and the second laser light source 402.

The invention claimed is:
1. A distance measurement system comprising
    a laser light source,
    a plurality of distance detectors arranged on a path that is formed as either a serial structure, a tree-shaped structure or a radial array in the space starting from the laser light source,
    a photodetector for detecting the light returned through the path, and
    a distance measuring apparatus for measuring the distance between the laser light source and each distance detector by analyzing the light detected by the photodetector, wherein
    each of the distance detectors returns part of the input light from a starting point side distance detector to the starting point side distance detector by reflection or both reflection and refraction, sends the remaining part of the light to a forefront side distance detector by transmission, reflection, refraction or a combination thereof, and returns the light returning from the forefront side distance detector to the photodetector through the starting point side distance detector by transmission, reflection, refraction or a combination thereof.

2. A distance measurement system according to claim 1, wherein the light heading the forefront side distance detector from the starting point side distance detector over the path is spatially separate from the light returning from the forefront side distance detector to the starting point side distance detector over the path.

3. A distance measurement system according to claim 1, wherein the light heading the forefront side distance detector from the starting point side distance detector over the path is spatially overlapped with the light returning from the forefront side distance detector to the starting point side distance detector over the path.

4. A distance measurement system according to claim 1, wherein the distance detector includes an optical component comprising a corner reflector for returning the input light from the starting side distance detector to the distance detector and/or a corner reflector for returning the input light from the forefront side distance detector to the starting point side distance detector through a semitransparent mirror or a reflection mirror.

5. A distance measurement system according to claim 1, wherein the distance detector at the terminal end of the path returns the entire input light from the starting point side distance detector to the photodetector through the starting point side distance detector by reflection.

6. A distance measurement system according to claim 1, further comprising a transmitter for sending a detection result generated by the distance measurement apparatus, wherein at least one of the distance detectors includes an optical axis adjustor, the optical axis adjustor includes
    a receiver for receiving the detection result from the transmitter and
    a controller for controlling the optical component so that the light output toward the forefront side distance detector illuminates the light receivable zone of the distance detector, and/or the light output from the starting point side distance detector illuminates the light receivable zone of the optical axis adjustor.

7. A distance measurement system according to claim 6, wherein the optical component is controlled so that the light output by the starting point side distance detector illuminates the light receivable zone of the optical axis adjustor when the distance detector is located at the terminal end of the path.

8. A distance measurement system according to claim 6, wherein the controller controls the input and the output of the distance detector independently.

9. A distance measurement system according to claim 1, wherein the controller comprises an optical axis direction adjusting mechanism for controlling the direction of the output optical axis and/or the input optical axis, and/or an optical axis position adjusting mechanism for controlling the output optical axis so that the optical axis moves on the plane that is at right angles to the optical axis maintaining its direction.

10. A distance measurement system according to claim 1, wherein at least part of the path is open to the air, at least one partial path is included in the entire path, the partial path is formed by an optical fiber between the plural distance detectors and has no distance detector therein, and the end of the optical fiber is open to the air through a fiber collimator which can function as a distance detector.

11. A distance measurement system according to claim 1, wherein the photodetector comprises a modulator for generating a modulation signal;

a reference laser light source for generating a laser light of a wavelength which is different from the wavelength generated by the laser light source by receiving the modulation signal;

a first optical amplifier for amplifying the laser light that is output from the laser light source and is returned through the light path by reflection;

an optical coupler for combining the laser light from the first optical amplifier with the laser light from the reference laser light source;

a second optical amplifier for amplifying the laser light from the optical coupler; and a photodetector for receiving the laser light from the second optical amplifier and generating an electrical output by Two-Photon Absorption; the distance measuring apparatus comprises a frequency detector for detecting a frequency component corresponding to the reflection position of the light returning by reflection through the light path of the laser light source by extracting a sine wave component which is included in the output signal of the photodetector and a controller for controlling the modulator.

* * * * *